(12) United States Patent
Yanagisawa et al.

(10) Patent No.: US 10,260,991 B2
(45) Date of Patent: *Apr. 16, 2019

(54) ABNORMALITY DIAGNOSIS SYSTEM

(71) Applicant: NSK LTD., Tokyo (JP)

(72) Inventors: Tomoyuki Yanagisawa, Fujisawa (JP); Tomoyuki Aizawa, Fujisawa (JP)

(73) Assignee: NSK LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/549,544

(22) PCT Filed: Feb. 17, 2016

(86) PCT No.: PCT/JP2016/054498
§ 371 (c)(1),
(2) Date: Aug. 8, 2017

(87) PCT Pub. No.: WO2016/133100
PCT Pub. Date: Aug. 25, 2016

(65) Prior Publication Data
US 2018/0038772 A1 Feb. 8, 2018

(30) Foreign Application Priority Data

Feb. 19, 2015 (JP) ................................ 2015-030986
Feb. 19, 2015 (JP) ................................ 2015-030987

(51) Int. Cl.
*G01H 1/08* (2006.01)
*G01M 13/02* (2019.01)
(Continued)

(52) U.S. Cl.
CPC ............ *G01M 13/04* (2013.01); *G01M 99/00* (2013.01); *F16C 19/52* (2013.01)

(58) Field of Classification Search
CPC ........................... G01M 13/04; G01M 13/045
(Continued)

(56) References Cited

U.S. PATENT DOCUMENTS 5,585,577 A * 12/1996 Lemoine et al. ....... B21B 31/07
374/153
6,672,681 B1   1/2004 Moretti et al.
(Continued)

FOREIGN PATENT DOCUMENTS

JP      62169034 A    7/1987
JP       447964 U    4/1992
(Continued)

OTHER PUBLICATIONS

English translation of JP 2009-191898A, Date of Patent Application Publication: Aug 27, 2009, Publisher: JPO and INPIT, pp. 10.*
(Continued)

*Primary Examiner* — Harshad R Patel
(74) *Attorney, Agent, or Firm* — Sughrue Mion, PLLC

(57) ABSTRACT

An abnormality diagnosis system includes a bearing having a plurality of components, a plurality of sensors disposed at different positions of the component and configured to detect surrounding signals, and an abnormality diagnosis device configured to diagnose abnormalities of the rolling bearing and a device disposed around the rolling bearing, based on signals output from the plurality of sensors.

6 Claims, 7 Drawing Sheets

(51) Int. Cl.
*G01M 13/04* (2019.01)
*G01N 29/00* (2006.01)
*F16C 19/52* (2006.01)
*G01M 99/00* (2011.01)

(58) Field of Classification Search
USPC .......................................... 73/593; 340/682
See application file for complete search history.

(56) References Cited

U.S. PATENT DOCUMENTS

| | | | |
|---|---|---|---|
| 7,184,930 B2* | 2/2007 | Miyasaka | B61F 15/20 246/169 A |
| 2006/0167659 A1 | 7/2006 | Miyasaka et al. | |
| 2007/0071057 A1 | 3/2007 | Ohta et al. | |
| 2013/0006540 A1 | 1/2013 | Sakaguchi et al. | |
| 2018/0038413 A1* | 2/2018 | Aizawa | F16C 19/525 |

FOREIGN PATENT DOCUMENTS

| JP | 2009109350 A | 5/2009 |
|---|---|---|
| JP | 2009191898 A | 8/2009 |
| JP | 2011154020 A | 8/2011 |

OTHER PUBLICATIONS

Authors: Hongrui Cao, Linkai Niu and Zhengjia He, Title: Method for Vibration Response Simulation and Sensor Placement Optimization of a Machine Tool Spindle System with a Bearing Defect, Date: Jun. 27, 2012, Publication: Sensors, edition: 12, pp. 8732-8754.*
Author: Wael Moussa, Title: Thermography-Assisted Bearing Condition Monitoring, Date: Jul. 2014, Publisher: Ottawa-Carleton Institute for Mechanical and Aerospace Engineering, University of Ottawa, pp. 209.*
Authors: Adrian D Nembhard et al., Title: Combined vibration and thermal analysis for the condition monitoring of rotating machinery, Date: 2014, Publication: Structural Health Monitoring, vol. 13(3), pp. 281-295.*
International Search Report dated May 17, 2016, by the International Searching Authority in counterpart International Application No. PCT/JP2016/054498 (PCT/ISA/210), pp. 5.
Written Opinion dated May 17, 2016, by the International Searching Authority in counterpart International Application No. PCT/JP2016/054498 (PCT/ISA/237), pp. 7 with translation.
Search Report dated Jan. 29, 2018 by the European Patent Office in counterpart European Patent Application No. 16752486.7, 10 pages.

* cited by examiner

ABNORMALITY DIAGNOSIS SYSTEM

TECHNICAL FIELD

The present invention relates to an abnormality diagnosis system.

RELATED ART

A machine facility such as a vehicle, a machine tool, a wind mill and the like is equipped with a variety of many bearings such as rolling bearings and the like. When wear or damage occurs at the machine facility as it is used for a long time, smooth rotation and sliding of the bearing are inhibited, so that an abnormal sound may be generated and the lifetime may be reduced. For this reason, in the related art, it is inspected whether an abnormality such as wear, damage and the like has occurred at the bearing, after the machine facility has been used for a predetermined time period.

The inspection is performed by disassembling a part of the machine facility, to which the bearing is incorporated, or the entire machine facility, and the damage or wear having occurred at the bearing is found by an inspection with operator's eyes. As a result of the inspection, when the abnormality such as wear, damage and the like is found at the bearing, the bearing is replaced with a new product so as to prevent a failure or trouble of the machine facility before happens. However, according to the inspection method of disassembling the part or whole of the machine facility and finding the damage or wear with operator's eyes, an operation of detaching the bearing from the machine facility and an operation of again incorporating the bearing, for which the inspection has been completed, to the machine facility require a great effort, which increases the maintenance cost of the machine facility.

In order to solve the above problem, an abnormality diagnosis device configured to perform abnormality diagnosis of the bearing at an actually operating state of the machine facility has been suggested. For example, a monitoring diagnosis system of a rotary machine equipment disclosed in Patent Document 1 is configured to compare a vibration level, which is detected by each vibration detection sensor, and a set alarm generation level for alarm determination at each provision position of the vibration detection sensors and for each operation pattern and displays an alarm with an alarm display means when the vibration level reaches the alarm generation level. Thereby, a place at which the abnormal vibration occurs is specified and the abnormal vibration place is clearly displayed. Also, an abnormality diagnosis device of a rolling bearing disclosed in Patent Document 2 is configured to perform abnormality diagnosis of the rolling bearing on the basis of an effective value of a vibration waveform measured using a vibration sensor and an effective value of an alternating-current component of an envelope waveform of the vibration waveform. Thereby, it is possible to implement the correct abnormality diagnosis.

CITATION LIST

Patent Document

Patent Document 1: Japanese Patent Application Publication No. 2009-109350A
Patent Document 2: Japanese Patent Application Publication No. 2011-154020A

SUMMARY OF THE INVENTION

Problems to be Solved

In the meantime, a variety of devices such as a motor incorporated into the machine facility are also inspected by disassembling parts of the machine facility, to which the devices are incorporated, or the entire machine facility. Therefore, it is preferably to perform the abnormality diagnosis of the diverse devices upon the abnormality diagnosis of the bearing, from standpoints of the maintenance cost of the machine facility, and the like. However, according to the inventions disclosed in Patent Documents 1 and 2, the abnormality diagnosis is simply performed for the members at which the sensors are provided and cannot be performed for a device except for the members to which the sensors are provided.

The present invention has been made in view of the above situations, and an object thereof is to provide an abnormality diagnosis system capable of performing abnormality diagnosis of a bearing and abnormality diagnosis of a device disposed around the bearing.

Means for Solving Problems

The above object of the present invention is achieved by following configurations.

(1) An abnormality diagnosis system including:
a bearing that has a plurality of components;
a plurality of sensors that are disposed at different positions of the component and that are configured to detect surrounding signals, and
an abnormality diagnosis device that is configured to diagnose abnormality of the bearing and abnormality of a device disposed around the bearing, based on signals output from the plurality of sensors.

(2) The abnormality diagnosis system of the above (1), wherein the components include an inner ring or an outer ring, and
wherein the plurality of sensors includes: a first sensor which is disposed in the vicinity of one axial end portion of the inner ring or outer ring of the bearing; a second sensor which is disposed in the vicinity of a raceway surface of the inner ring or outer ring of the bearing; and a third sensor which is disposed in the vicinity of the other axial end portion of the inner ring or outer ring of the bearing.

(3) The abnormality diagnosis system of the above (2), wherein the outer ring is a fixed ring.

(4) The abnormality diagnosis system of the above (2), wherein the inner ring is a rotary ring.

(5) The abnormality diagnosis system of one of the above (1) to (4), wherein the abnormality diagnosis device is configured to specify a sensor which output value firstly increases or which output value firstly exceeds a predetermined threshold value, from the plurality of sensors and to determine which of the bearing and the devices is abnormal, based on a position at which the specified sensor is disposed.

(6) The abnormality diagnosis system of any one of the above (1) to (5), wherein the plurality of sensors is respectively temperature sensors.

(7) The abnormality diagnosis system of any one of the above (1) to (5), wherein the plurality of sensors is respectively vibration sensors.

(8) The abnormality diagnosis system of any one of the above (1) to (5), wherein the plurality of sensors is respectively load sensors.

(9) The abnormality diagnosis system of the above (8), wherein the plurality of sensors is not disposed on a same circumference.

Effects of the Invention

According to the present invention, it is possible to perform the abnormality diagnosis of the bearing and the abnormality diagnosis of the devices disposed around the bearing.

DETAILED DESCRIPTION OF ILLUSTRATIVE EMBODIMENTS

Hereinafter, an abnormality diagnosis system in accordance with each illustrative embodiment of the present invention will be described with reference to the drawings.

First Illustrative Embodiment

Figure 1:
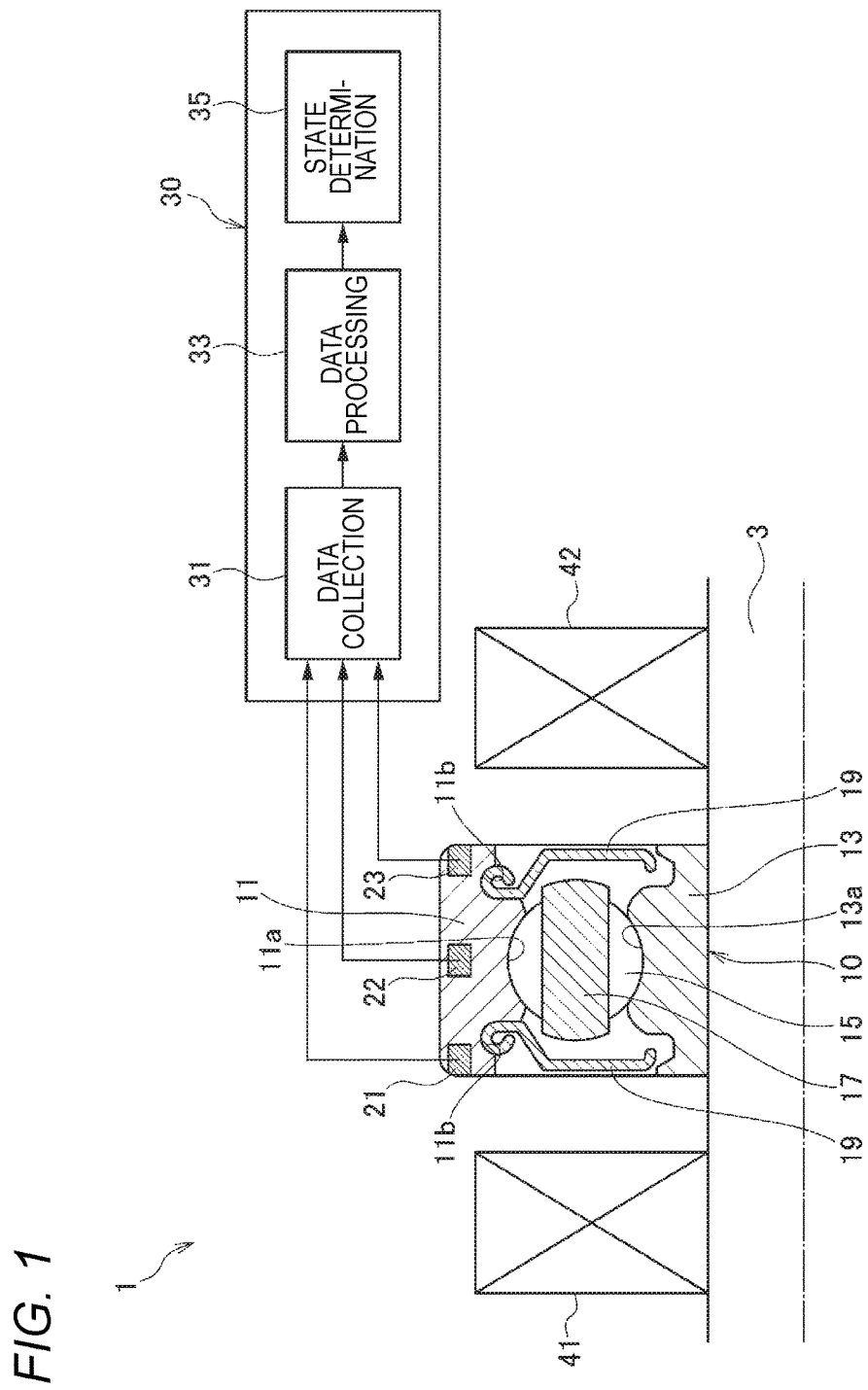
FIG. 1 is a schematic view of an abnormality diagnosis system in accordance with a first illustrative embodiment.

As shown in FIG. 1, an abnormality diagnosis system 1 of a first illustrative embodiment includes a rolling bearing 10, a plurality of sensors 21, 22, 23 provided for the rolling bearing 10, and an abnormality diagnosis device 30 configured to diagnose abnormalities of the rolling bearing 10 and a variety of devices (for example, a motor 41 and a pump 42) on the basis of signals output from the plurality of sensors 21, 22, 23.

The rolling bearing 10 includes an outer ring 11 (a fixed ring) having an outer ring raceway surface 11a formed on an inner peripheral surface thereof, an inner ring 13 (a rotary ring) having an inner ring raceway surface 13a formed on an outer peripheral surface thereof, a plurality of balls 15 disposed to be rollable between the outer ring raceway surface 11a and the inner ring raceway surface 13a, a retainer 17 configured to hold the plurality of balls 15 to be rollable and a pair of seal members 19 fixed at both axial sides of the inner peripheral surface of the outer ring 11. That is, the rolling bearing 10 includes a plurality of components such as the outer ring 11, the inner ring 13, the ball 15, the retainer 17, the seal member 19 and the like.

The inner ring 13 is a rotary ring externally fitted and fixed to a shaft 3 and configured to rotate together with the shaft 3. At one axial end-side (a left side in FIG. 1) of the rolling bearing 10, a motor 41 (a device) is fixed to the shaft 3 and the shaft 3 is configured to be rotatively driven by a rotor (not shown) of the motor 41. Also, at the other axial end-side (a right side in FIG. 1) of the rolling bearing 10, a pump 42 is fixed to the shaft 3, and a driving force of the motor 41 is transmitted to the pump 42 via the shaft 3.

The outer ring 11 is a fixed ring internally fitted and fixed to a housing (not shown) and configured not to rotate. The inner peripheral surface of the outer ring 11 is formed at both axial sides of the outer ring raceway surface 11a with a pair of seal grooves 11b for fixing the pair of seal members 19 thereto. Each of the pair of seal members 19 is a non-contact type extending radially and configured to face the outer peripheral surface of the inner ring 13 via a gap. Thereby, the pair of seal members 19 is configured to seal a space between the outer ring 11 and the inner ring 13 and to prevent foreign matters from being introduced into the bearing from an outside. Also, the not-contact type seal members 19 are used, so that it is possible to suppress an influence on temperature detection of temperature sensors (which will be described later).

In the first illustrative embodiment, the machine device includes the rotary shaft 3, the housing, the rolling bearing 10, the motor 41 as a first device disposed at one axial end-side of the rolling bearing 10 and the pump 42 as a second device disposed at the other axial end-side of the rolling bearing 10.

Also, the first to third sensors 21, 22, 23 configured to detect surrounding signals are embedded at different positions of the outer ring 11. In the first illustrative embodiment, the plurality of sensors 21, 22, 23 includes a first temperature sensor 21 disposed in the vicinity of one axial end portion of the outer ring 11, a second temperature sensor 22 disposed at an axially central portion in the vicinity of the outer ring raceway surface 11a, and a third temperature sensor 23 disposed in the vicinity of the other axial end portion.

Meanwhile, in the first illustrative embodiment, the plurality of sensors 21, 22, 23 is disposed at the same radial position. However, they may also be disposed at different radial positions.

The temperatures to be detected by the first to third temperature sensors 21 to 23 are influenced by heat to be generated from the rolling bearing 10, the motor 41 and the pump 42. At this time, the influence levels are different depending on the disposition positions. That is, the first temperature sensor 21 disposed in the vicinity of the motor 41 is likely to be influenced by a change in temperature of the motor 41, the second temperature sensor 22 disposed in the vicinity of the ball 15, the inner ring 13 or the like is likely to be influenced by a change in temperature of the rolling bearing 10, and the third temperature sensor 23 disposed in the vicinity of the pump 42 is likely to be influenced by a change in temperature of the pump 42.

The first to third temperature sensors 21 to 23 are configured to output the detected temperatures and to transmit the same to the abnormality diagnosis device 30. The abnormality diagnosis device 30 is a microcomputer, for example. A program recorded in the microcomputer is executed, so that respective units such as a data collection unit 31 execute following processing.

A data collection unit 31 of the abnormality diagnosis device 30 is configured to collect the output data from the first to third temperature sensors 21 to 23. A data processing unit 33 of the abnormality diagnosis device 30 is configured to process the collected output data and to store the respective output data. A state determination unit 35 of the abnormality diagnosis device 30 is configured to specify a sensor of which an output value first increases from a rated temperature or first exceeds a predetermined threshold value from the first to third temperature sensor 21 to 23. Also, the state determination unit 35 is configured to determine which of the rolling bearing 10, the motor 41 and the pump 42 is abnormal, based on a position at which the specified sensor (hereinafter, referred to as 'specific sensor') is disposed.

For example, when the first temperature sensor 21 is the specific sensor, it is determined that the motor 41 is abnormal because the first temperature sensor 21 is disposed in the vicinity of the motor 41, as compared to the second and third temperature sensors 22, 23. Also, when the second temperature sensor 22 is the specific sensor, it is determined that the rolling bearing 10 is abnormal because the second temperature sensor 22 is disposed in the vicinity of the ball 15, the inner ring 13 or the like, as compared to the third and first temperature sensors 23, 21. Also, when the third temperature sensor 23 is the specific sensor, it is determined that the pump 42 is abnormal because the third temperature sensor 23 is disposed in the vicinity of the pump 42, as compared to the first and second temperature sensors 21, 22.

Figure 2:
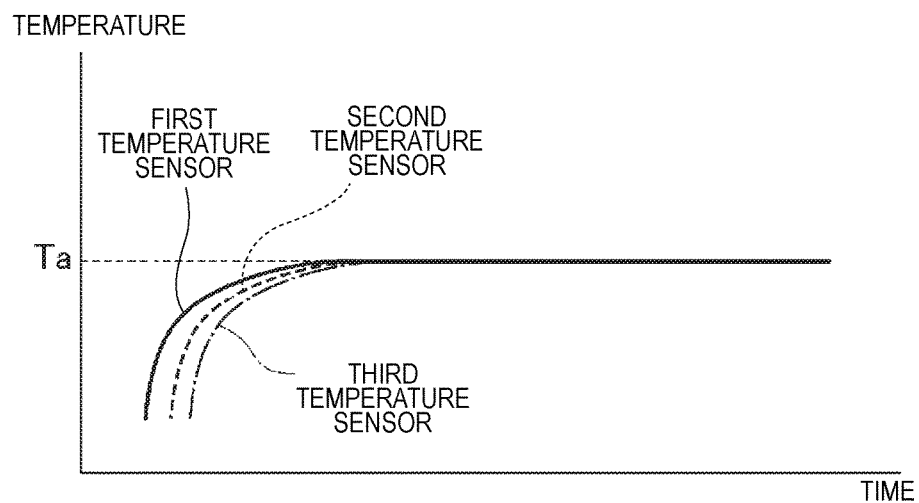
FIG. 2 is a graph depicting a relation between a detected temperature of each sensor and time.

In a machine facility in which the abnormality diagnosis system 1 is incorporated, the bearing 10, the motor 41 and the pump 42 generate the heat, and times of temperature rising thereof are different. For this reason, as shown in FIG. 2, temperature rising curves obtained from the output values of the first to third temperature sensors 21 to 23 are different immediately after the machine facility starts. However, at a steady state after predetermined time, since the temperature of the outer ring 11 becomes the same as the environment temperature around the rolling bearing 10, there is no difference in temperatures to be detected by the first to third temperature sensors 21 to 23, so that the temperatures become a rated temperature Ta.

Herein, a case where the motor 41 abnormally generates heat due to any cause at time t after the rated temperature Ta is described with reference to FIG. 3. In this case, the output value of the first temperature sensor 21 disposed in the vicinity of the motor 41, as compared to the second and third temperature sensors 22, 23, first increases and then the output values increase in order of the second temperature sensor 22 and the third temperature sensor 23. Then, the output values exceed a predetermined threshold value Tb in order of the first temperature sensor 21, the second temperature sensor 22 and the third temperature sensor 23.

Therefore, the abnormality diagnosis device 30 specifies the first temperature sensor 21, as the sensor of which the output value first increases or the sensor of which the output value first exceeds the threshold value Tb. Then, the abnormality diagnosis device determines that the motor 41 is abnormal, based on the position at which the first temperature sensor 21 is disposed, i.e., based on the configuration where the first temperature sensor 21 is disposed in the vicinity of the motor 41.

Subsequently, a case where the rolling bearing 10 abnormally generates heat due to causes such as seizing, wear and the like at time t after the rated temperature Ta is described with reference to FIG. 4. In this case, the output value of the second temperature sensor 22 disposed in the vicinity of the rolling bearing 10, as compared to the third and first temperature sensors 23, 21, first increases and then the output values increase in order of the third temperature sensor 23 and the first temperature sensor 21. Then, the output value of the second temperature sensor 22 first exceeds the threshold value Tb and the output values of the third temperature sensor 23 and the first temperature sensor 21 exceed the threshold value Tb.

Therefore, the abnormality diagnosis device 30 specifies the second temperature sensor 22, as the sensor of which the output value first increases or the sensor of which the output value first exceeds the threshold value Tb. Then, the abnormality diagnosis device determines that the rolling bearing 10 is abnormal, based on the position at which the second temperature sensor 22 is disposed, i.e., based on the configuration where the second temperature sensor 22 is disposed in the vicinity of the rolling bearing 10.

Subsequently, a case where the pump 42 abnormally generates heat due to any cause at time t after the rated temperature Ta is described with reference to FIG. 5. In this case, the output value of the third temperature sensor 23 disposed in the vicinity of the pump, as compared to the first and second temperature sensors 21, 22, first increases and then the output values increase in order of the second temperature sensor 22 and the first temperature sensor 21. Then, the output values exceed the predetermined threshold value Tb in order of the third temperature sensor 23, the second temperature sensor 22 and the first temperature sensor 21.

Therefore, the abnormality diagnosis device 30 specifies the third temperature sensor 23, as the sensor of which the output value first increases or the sensor of which the output value first exceeds the threshold value Tb. Then, the abnormality diagnosis device determines that the pump 42 is abnormal, based on the position at which the third temperature sensor 23 is disposed, i.e., based on the configuration where the third temperature sensor 23 is disposed in the vicinity of the pump 42.

Like this, according to the abnormality diagnosis system 1 of the first illustrative embodiment, it is possible to effectively perform the abnormality diagnosis of the rolling bearing 10 and the abnormality diagnosis of the devices (the motor 41 and the pump 42) disposed around the rolling bearing 10.

Second Illustrative Embodiment

Figure 6:
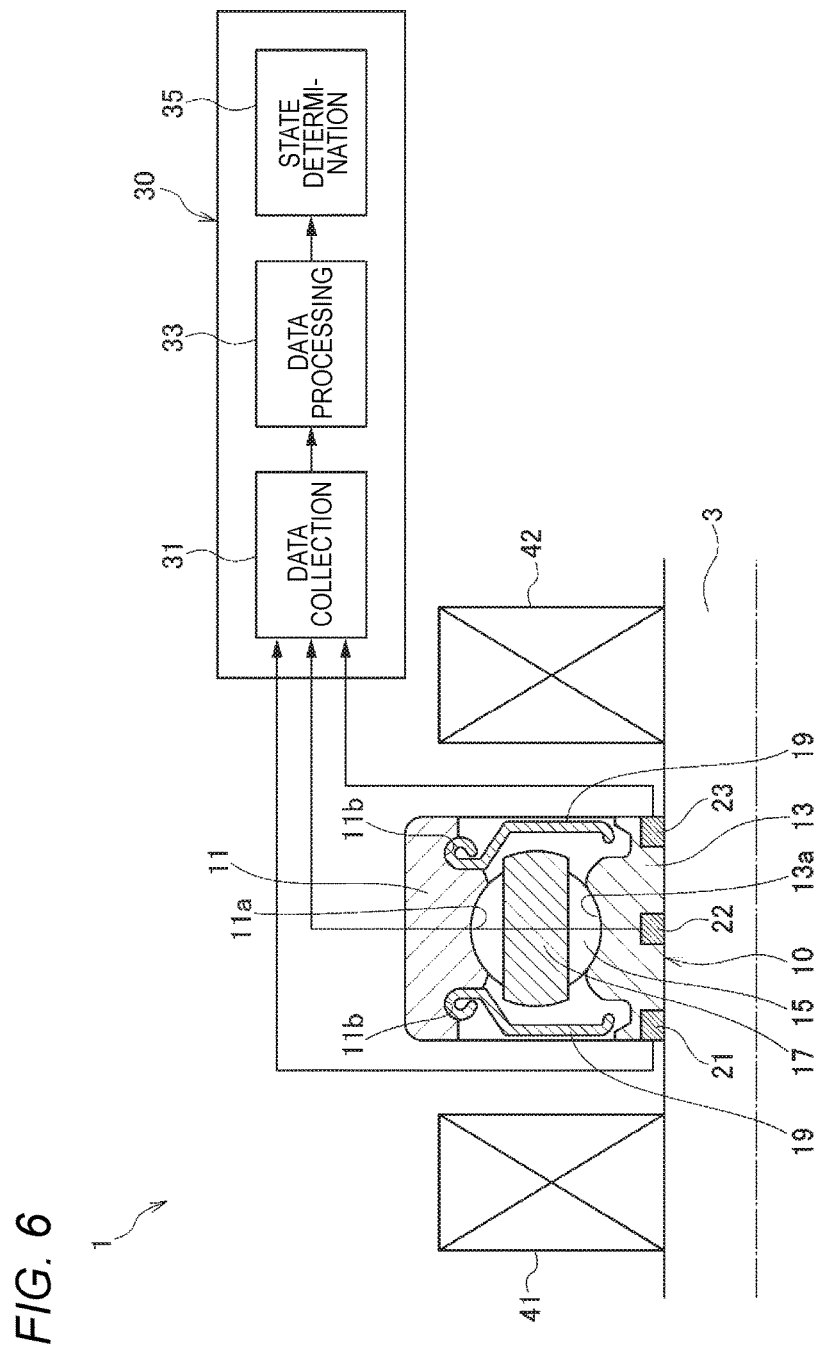
FIG. 6 is a schematic view of an abnormality diagnosis system in accordance with a second illustrative embodiment.

In the below, an abnormality diagnosis system 1 in accordance with a second illustrative embodiment of the present invention is described with reference to FIG. 6. In the meantime, the parts, which are the same or equivalent to those of the first illustrative embodiment, are denoted with the same reference numerals and the descriptions thereof are omitted or simplified.

In the first illustrative embodiment, the plurality of sensors 21 to 23 is disposed at the different positions of the outer ring 11, which is the fixed ring. However, in the second illustrative embodiment, the plurality of sensors 21, 22, 23 configured to detect the surrounding signals is embedded at different positions of the inner ring 13, which is the rotary ring. That is, in the second illustrative embodiment, the plurality of sensors 21, 22, 23 includes the first temperature sensor 21 disposed in the vicinity of one axial end portion of the inner ring 13, the second temperature sensor 22 disposed at the axially central portion in the vicinity of the inner ring raceway surface 13a and the third temperature sensor 23 disposed in the vicinity of the other axial end portion.

Therefore, also in the second illustrative embodiment, the first temperature sensor 21 disposed in the vicinity of the motor 41 is likely to be influenced by a change in temperature of the motor 41, the second temperature sensor 22 disposed in the vicinity of the ball 15, the outer ring 11 or the like is likely to be influenced by a change in temperature of the rolling bearing 10, and the third temperature sensor 23 disposed in the vicinity of the pump 42 is likely to be influenced by a change in temperature of the pump 42.

Also in the second illustrative embodiment, like FIG. 2 of the first illustrative embodiment, the temperature rising curves obtained from the output values of the first to third temperature sensors 21 to 23 are different immediately after the machine facility starts. Also, at a steady state after predetermined time, since the temperature of the inner ring 13 becomes the same as the environment temperature around the rolling bearing 10, there is no difference in temperatures to be detected by the first to third temperature sensors 21 to 23, so that the temperatures become the rated temperature Ta.

Figure 3:
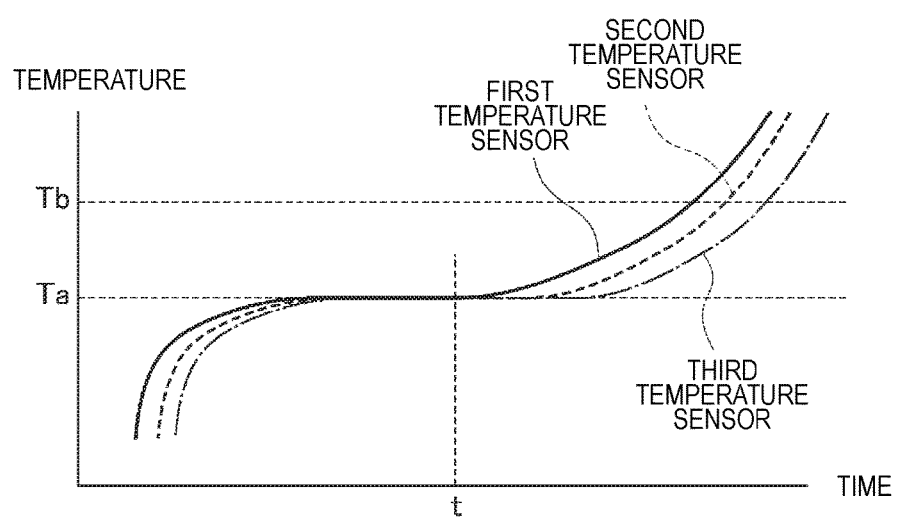
FIG. 3 is a graph depicting a relation between the detected temperature of each sensor and time when an abnormality has occurred in a motor.
Figure 4:
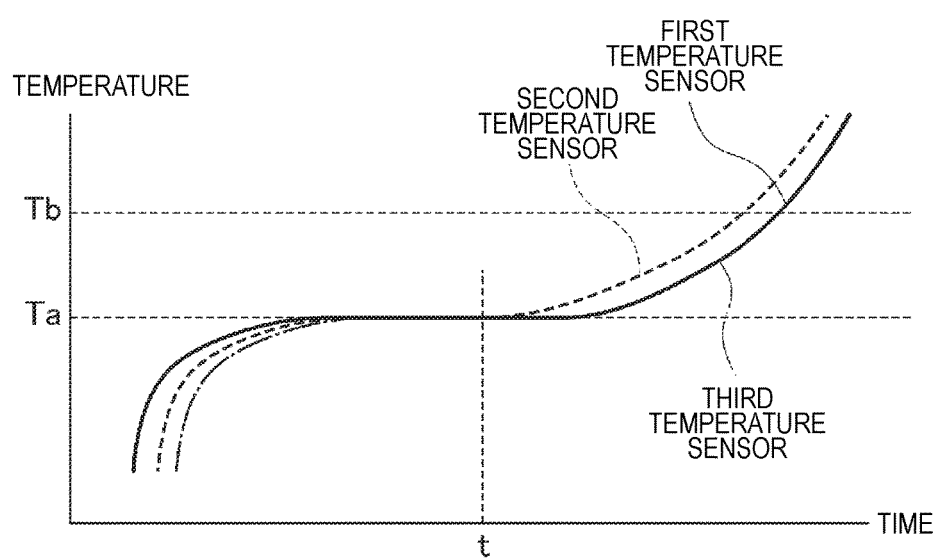
FIG. 4 is a graph depicting a relation between the detected temperature of each sensor and time when an abnormality has occurred in a bearing.
Figure 5:
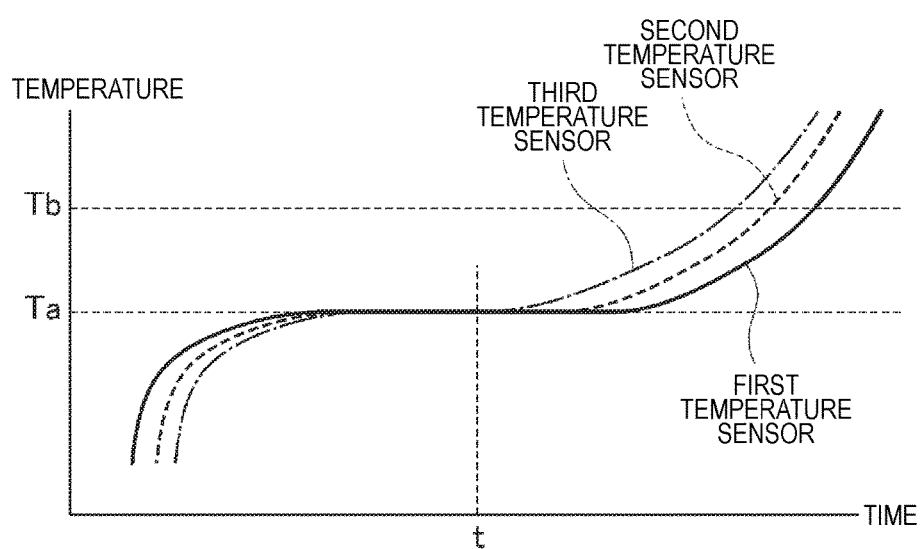
FIG. 5 is a graph depicting a relation between the detected temperature of each sensor and time when an abnormality has occurred in a pump.

Therefore, also in the second illustrative embodiment, it is possible to determine whether any one of the motor 41, the rolling bearing 10 and the pump 42 is abnormal, based on the graphs depicting the output values of the first to third temperature sensor 21 to 23, which are shown in FIGS. 3 to 5.

Like this, according to the abnormality diagnosis system 1 of the second illustrative embodiment, it is possible to effectively perform the abnormality diagnosis of the rolling bearing 10 and the abnormality diagnosis of the devices (the motor 41 and the pump 42) disposed around the rolling bearing 10.

The other configurations and effects are the same as the first illustrative embodiment.

In the meantime, the present invention is not limited to the illustrative embodiments and can be appropriately changed and improved.

For example, the abnormality diagnosis device 30 may be configured not only to specify a sensor of which an output value first increases or a sensor of which an output value first exceeds the predetermined threshold value Tb but also to specify a sensor of which an output value secondarily increases or a sensor of which an output value second exceeds the threshold value Tb. Then, the abnormality diagnosis device 30 is configured to determine which of the rolling bearing 10 and the devices is abnormal, based on a position of the sensor first specified and a position of the sensor second specified. Thereby, it is possible to more correctly determine the part at which the heat is generated and to improve the precision of the abnormality determination. Likewise, the abnormality diagnosis device 30 may be configured to determine which of the rolling bearing 10 and the devices is abnormal, based on a position of the sensor first specified, a position of the sensor second specified and a position of the sensor third specified.

Also, the number of sensors to be provided is not particularly limited inasmuch as a plurality of sensors is provided, and may increase or decrease in connection with a machine device to which the abnormality diagnosis system is to be incorporated. For example, in the illustrative embodiments, when the pump 42 is not provided, the third temperature sensor 23 may not be provided.

Also, the sensor to be provided is not particularly limited inasmuch as it can monitor the state of the rolling bearing 10 or the device (for example, the motor 41 or the pump 42) disposed around the rolling bearing. For example, a vibration sensor or a load sensor may be adopted. Herein, like the illustrative embodiment, when the sensor is disposed at the inner ring 13, which is the rotary ring, heat, vibration, load and the like are to be transmitted from the shaft 3. Therefore, it is possible to rapidly detect the behavior, as compared to the configuration where the sensor is provided at the other component of the rolling bearing 10.

Third Illustrative Embodiment

Figure 7:
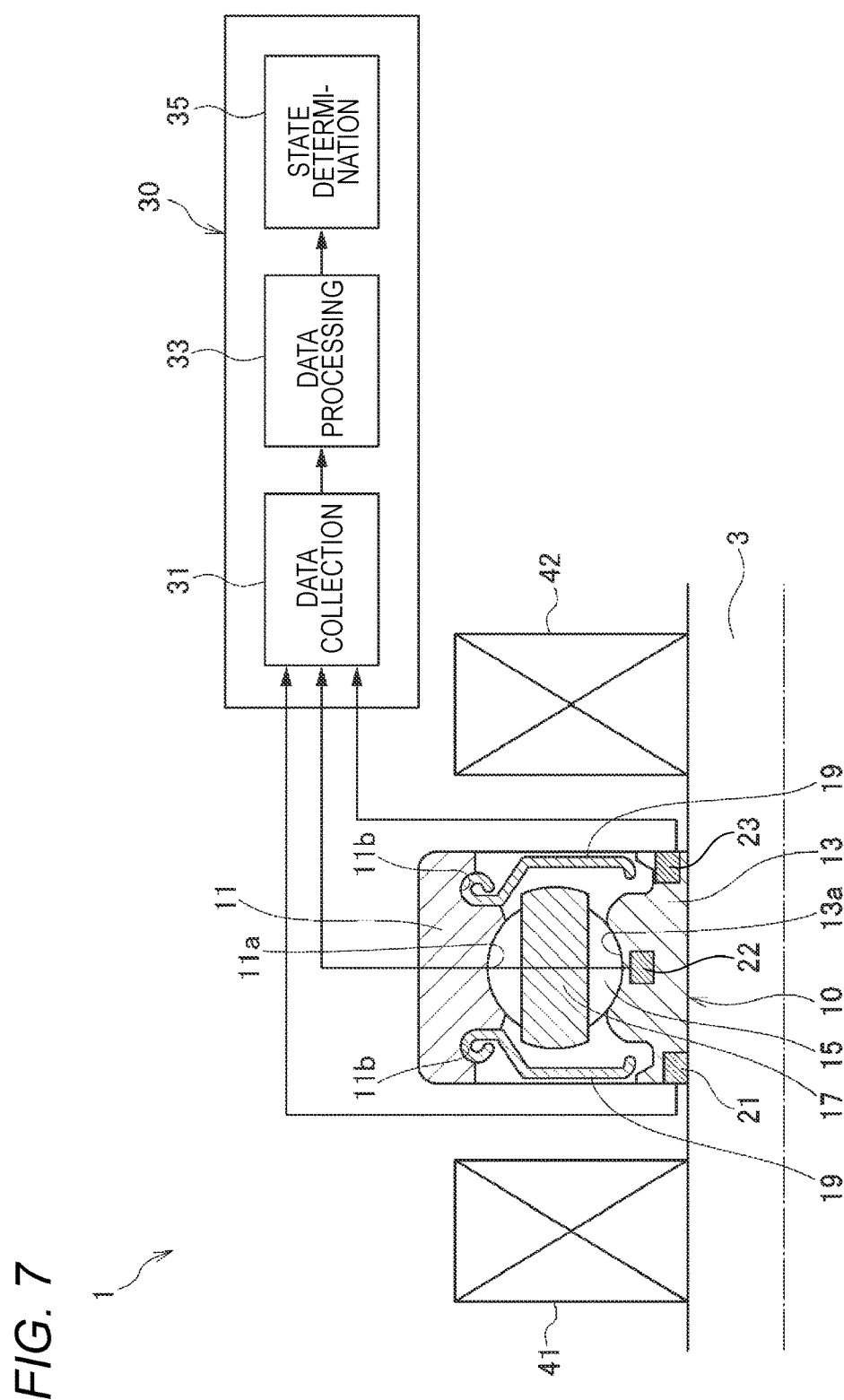
FIG. 7 is a schematic view of an abnormality diagnosis system in accordance with a third illustrative embodiment.

In the below, an abnormality diagnosis system 1 in accordance with a third illustrative embodiment of the present invention is described with reference to FIG. 7. When the load sensor is adopted as the sensor to be provided, if the load sensor is disposed at the outer ring 11, which is the fixed ring, the load sensor should be disposed in a load zone, which limits a disposition phase on a circumference. However, when the load sensor is disposed at the inner ring 13, which is the rotary ring, like the second illustrative embodiment, the disposition phase is not limited, so that it is possible to dispose a plurality of load sensors with being spaced on the circumference. For this reason, when the load sensors are disposed one by one at any phase on the circumference, it is possible to detect the behaviors at the respective phases. That is, when the load sensors are disposed at the rotary ring, one load sensor may be disposed at a phase on one circumference, without disposing the plurality of load sensors at phases on the same circumference. Therefore, the plurality of load sensors is disposed at different positions, as seen from an axial direction.

Also, the disposition position of the sensor is not limited to the outer ring 11 or the inner ring 13 inasmuch as it is disposed at a component of the rolling bearing 10. For example, the retainer 17 or the seal member 19 is also possible.

Also, the signal transmission method from the sensor to the data collection unit 31 of the abnormality diagnosis device 30 may be any method, irrespective of whether it is a wired or wireless method.

When the abnormality diagnosis device 30 determines the abnormalities of the rolling bearing 10, the motor 41 and the pump 42, the abnormality diagnosis device may notify the abnormalities to an upper system so as to automatically stop the machine facility or issue a warning to an operator and a manager with an alarm, a screen display and the like.

The devices to be disposed around the rolling bearing 10 are not limited to the motor 41 and the pump 42, and any device can be adopted.

The subject application is based on a Japanese Patent Application No. 2015-030986 filed on Feb. 19, 2015 and a Japanese Patent Application No. 2015-030987 filed on Feb. 19, 2015, which are herein incorporated by reference.

DESCRIPTION OF REFERENCE NUMERALS

1: abnormality diagnosis system
10: bearing
11: outer ring (component, fixed ring)
13: inner ring (component, rotary ring)
15: ball (component)
17: retainer (component)
19: seal member (component)
21: first temperature sensor
22: second temperature sensor
23: third temperature sensor
30: abnormality diagnosis device
31: data collection unit
33: data processing unit
35: state determination unit
41: motor (device)
42: pump (device)

The invention claimed is:
1. An abnormality diagnosis system comprising:
a bearing that has a plurality of components;
a plurality of sensors that are disposed at different positions of the components; and
an abnormality diagnosis device that is configured to diagnose both of an (i) abnormality of the bearing and

(ii) abnormality of a device disposed around the bearing, based on signals output from the plurality of sensors, wherein the plurality of sensors are of one type including any one of a temperature sensor, a vibration sensor, and a load sensor, and wherein the device includes a motor and a pump.

2. The abnormality diagnosis system according to claim 1, wherein the components include an inner ring or an outer ring, and wherein the plurality of sensors comprises:

a first sensor which is disposed in the vicinity of one axial end portion of the inner ring or outer ring of the bearing;

a second sensor which is disposed in the vicinity of a raceway surface of the inner ring or outer ring of the bearing; and a third sensor which is disposed in the vicinity of the other axial end portion of the inner ring or outer ring of the bearing.

3. The abnormality diagnosis system according to claim 2, wherein the outer ring is a fixed ring.

4. The abnormality diagnosis system according to claim 2, wherein the inner ring is a rotary ring.

5. The abnormality diagnosis system according to claim 1, wherein the abnormality diagnosis device is configured to specify a sensor which output value firstly increases or which output value firstly exceeds a predetermined threshold value, from the plurality of sensors and to determine which of the bearing, motor, and pump is abnormal, based on a position at which the specified sensor is disposed.

6. The abnormality diagnosis system according to claim 1, wherein the plurality of sensors is not disposed on a same circumference.

* * * * *